United States Patent [19]

Leach

[11] Patent Number: 5,061,506

[45] Date of Patent: Oct. 29, 1991

[54] CULINARY FAT COMPOSITIONS AND BAKERY MIXTURES CONTAINING THEM

[75] Inventor: Warren Leach, Merseyside, England

[73] Assignee: Van den Bergh Foods Co., Division of Conopco, Inc., Lisle, Ill.

[21] Appl. No.: 542,676

[22] Filed: Jun. 22, 1990

Related U.S. Application Data

[63] Continuation of Ser. No. 245,933, Sep. 14, 1988, abandoned, which is a continuation of Ser. No. 930,464, Nov. 12, 1986, abandoned.

[30] Foreign Application Priority Data

Nov. 15, 1985 [GB] United Kingdom ................. 8528201

[51] Int. Cl.$^5$ .............................................. A23D 9/00
[52] U.S. Cl. ...................................... 426/602; 426/549; 426/553; 426/554; 426/603; 426/607
[58] Field of Search ............... 426/602, 603, 607, 549, 426/553, 554

[56] References Cited

U.S. PATENT DOCUMENTS

| | | | |
|---|---|---|---|
| 3,607,305 | 9/1971 | Westenberg | 426/603 |
| 3,889,011 | 6/1975 | Read | 426/604 |
| 4,169,843 | 8/1979 | Snyder | 260/409 |
| 4,390,561 | 6/1983 | Blair et al. | 426/603 |

OTHER PUBLICATIONS

European Search Report against EP Application 232,590.

*Primary Examiner*—Donald E. Czaja
*Assistant Examiner*—D. Workman
*Attorney, Agent, or Firm*—A. Kate Huffman

[57] ABSTRACT

The fat content of shortenings, margarine and other plastic emulsion fat products containing substantial amounts of combined polyunsaturated fatty acids, also meets specified melting profile requirements and contains limited amounts of combined saturated and trans fatty acids including palmitic acid.

9 Claims, No Drawings

CULINARY FAT COMPOSITIONS AND BAKERY MIXTURES CONTAINING THEM

This is a continuation application of Ser. No. 245,933, filed Sept. 14, 1988 now abandoned, which is a continuation of Ser. No. 6/930,464, filed Nov. 11, 1986 now abandoned.

BACKGROUND OF THE INVENTION

This invention relates to edible plastic fat-continuous emulsion food spreads, including margarine, and shortenings and their preparation, particularly for but not exclusively for culinary use.

For whatever purpose it is intended, whether for eating directly as a spread or for culinary purposes such as confectionery or baking purposes, similar requirements prevail for the fat component of margarine, in particular with regard to plasticity and spreadability. The aim is to provide high emulsion stability, wide plasticity range as little temperature-dependent as possible, and suitable consistency. These two last requirements are determined by a variety of considerations including choice of fat and glyceride oils, and cooling and working processes both of which affect these requirements through the crystal structure of the solidified glycerides of the fats and oils. The fat composition of margarine generally includes a glyceride oil or base stock which is retained in the products in the crystal matrix provided by a harder fat component or hard stock. For culinary purposes certain particular requirements are emphasised for example high creaming power while others such as eating quality decline correspondingly in importance, although it remains a relevant factor. For pastry fat on the other hand, high creaming power is less important than shortening power. The keeping quality of the margarine used is also important in baked goods and the fats and oils present must therefore be resistant to oxidation as far as possible. More recently, health considerations have imposed the additional requirement of a fatty acid residue in the glycerides constituting the fats and oils used, which combines high polyunsaturation i.e. a high combined linoleic acid content, with low saturated and trans acid content. To meet this requirement vegetable oils must be used in the base stock with an Iodine Value of at least 75.

DESCRIPTION OF THE RELATED ART

In U.S. Pat. specification 3,889,011 margarine products are described having as fat component a glyceride composition including a randomly distributed arrangement of palmitic, stearic and unsaturated fatty acid residues. In U.S. Pat. No. 3,949,105 a margarine fat is described comprising co-randomised and unrandomised components of which the former comprises palm, lauric and trans-containing fats in specified proportions.

British patent specification 1455828 discloses fat blends suitable for use in preparing non-grainy margarines and shortenings and comprising a palm-based fat and a co-randomised mixture of a palm-based fat and a non-palm-based fat, having a specified PUP:PPU: ratio, where P=palmitic and U=unsaturated. U.S. Pat. No. 4,055,679 also describes a fat product containing both co-randomised and non-randomised constituents, which are derived from palm oil and conforms to specified SUS:SSU ratios, where S=saturated fatty acids.

Fat blends suitable for shortenings and margarines are also described in U.S. Pat. No. 4,087,564 which comprise a fraction of a co-randomised fat blend and contain specified amounts of palmitic and unsaturated fatty acids containing only cis bonds, with a limited permitted amount of triglycerides of saturated fatty acids and preferably a specified ratio of palmitic to higher saturated fatty acids.

EPO 84900 describes a margarine fat blend with a reduced tendency to sandiness, comprising a linoleic acid oil and a hydrogenated fat containing palmitic acid which is obtained by interesterification.

SUMMARY OF THE INVENTION

The present invention provides a plastic, fat-continuous emulsion food product the consistency of which is represented by N values measured by NMR methods of 13 to 16 at 20° C. and a maximum of 3 at 40° C., the fat content of which consists of triglycerides of polyunsaturated acids, at least 2% trans acids, at most about 30% combined trans and saturated fatty acids and at least 5% palmitic acid, the fat composition comprising an unrandomised blend of vegetable oil e.g. soya bean, sunflower and/or safflower oils, with a selectively hardened fat and including a palm fat. The percentages are by weight of the total combined fatty acids in the fat comprising the fat phase.

Preferably the products of the invention also contain selectively hardened vegetable oil, preferably twice as much as the palm fat, which is itself preferably selectively hardened. Preferably also the total blend fat is composed of at least ⅔, more preferably 70 to 80 percent vegetable oil, balance hardened palm fat and/or other oil. The palm fat present is palm or cottonseed oil and their fractions and it may be selectively hardened. Selective hardening is widely adopted in the art to modify the physical characteristics of a fat or oil by converting polyunsaturated fatty acids present to mono-olefinic unsaturation, in the presence of appropriate selective catalysts; the effect is accompanied by isomerisation of remaining double bonds present from the cis to the trans isomer, the trans isomer of oleic acid being elaidic acid with a somewhat higher melting point, reflected in the melting point of the triglyceride in which it is present. The slip melting point of at least part of the palm fat should preferably be at least 47° C., preferably to approximately 50° C. The trans content of any selectively hardened palm fat present should preferably be at least 15, and the minimum trans content for the total fat is preferably 3.0. The fat product of the invention may be in the form of shortening fat or as the fat in margarine or low fat emulsion food products, preferably fat-continuous.

It is surprising that the superior performance of the margarines according to the present invention requires the presence of trans acids combined with the palmitic acid of the palm fat and that a comparable performance is not obtained using fats free from trans acid, even those containing palm fat of similar or even higher slip melting point values obtained for example by fractionation of palm oil.

DESCRIPTION OF THE PREFERRED EMBODIMENTS

EXAMPLES

Shortenings and margarine according to the invention were prepared together with control products for comparison, from blends of sunflower oil containing 68% unsaturated fatty acids, with selectively hardened fats containing trans acids, using sulphur-poisoned nickel catalyst to hydrogenate soya bean oil to a slip melting point of 44° C., or palm oil to 50° C. Palm oil stearine fractionated from acetone and having a slip melting point of 56° C. was also used.

In the preparation of margarine the aqueous phase amounted to approximately 15% of the margarine and included conventional additives including salt and permitted emulsifier, antioxidant and flavour additives.

housewife or baker for baking cakes, cookies and a like, if necessary with the addition of whole egg or supplementary ingredients to the mix. A particularly suitable blend for this purpose includes the shelf-stable wholemeal flour described in BP 2126465 which comprises a blend of extracted flour with unimpaired amylase activity and dietary fibre comprising the total non-endosperm fraction from separately milled grain selectively treated to suppress enzyme activity.

TABLE 1

|   | Fat Composition wt % | | | | | Fatty acid components of fat wt % | | |
| --- | --- | --- | --- | --- | --- | --- | --- | --- |
|   |   | SB | Palm Slip M Pt. °C. | | |   |   | TRANS & |
|   | SN | 44 | 47 | 50 | 56 | TRANS | SAFA | SAFA |
| EXAMPLE | | | | | | | | |
| 1 | 75 | 17 |   |   | 8 | 9.1 | 20.7 | 29.8 |
| 2 | 80 |   |   | 20 |   | 2.0 | 22.4 | 24.4 |
| 3 | 76 |   | 24 |   |   | 3.6 | 22.8 | 26.1 |
| 4 | 66 | 25 | 9 |   |   | 11.25 | 20.6 | 31.85 |
| 5 | 75 | 18 |   |   | 7 | 8.11 | 20.75 | 28.85 |
| CONTROL | | | | | | | | |
| 1 | 80 |   |   |   | 20 | 0 | 27 | 27 |
| 2 | 80 | 6 |   |   | 14 | 0 | 24.26 | 24.26 |

SAFA = Saturated fatty acid
SN = Sunflower oil
SB = Soyabean oil

TABLE 2

| | FAT CHARACTERISTICS | | | SPECIFIC VOLUME | | | |
| --- | --- | --- | --- | --- | --- | --- | --- |
| | NMR SOLIDS CONTENT | | SLIP M.Pt | CAKE | | CREAM | |
| | 20° C. | 40° C. | °C. | MARGARINE | SHORTENING | MARGARINE | SHORTENING |
| EXAMPLE | | | | | | | |
| 1 | 13.5 | 0.8 | 37.8 | 2.23 | 2.25 | 1.77 | 2.11 |
| 2 | 12.5 | 1.8 | 39.7 | 2.16 | 2.26 | 1.73 | 2.23 |
| 3 | 14.5 | 2.4 | 39.1 | 2.34 | 2.35 | 1.81 | 1.81 |
| 4 | 12.6 | 0.6 | 35.0 | 2.33 | | 2.00 | |
| 5 | 11.8 | 0.5 | 37.4 | 2.32 | | 1.95 | |
| CONTROL | | | | | | | |
| 1 | 16.9 | 8.8 | 44.8 | 1.83 | 1.78 | 1.44 | 1.44 |
| 2 | 12.5 | 5.5 | 43.4 | 1.86 | | 1.59 | |

Both products were conventionally worked in scraped-surface chilling heat exchangers.

Bakery and creaming performance of the margarine and shortening products were examined by measuring the specific volume at 20° C., of a cake batter for a pound cake and for the baked cake itself using the fat products, the test on the baked cake being by the method of displacement of rapeseeds conventionally practised in the art.

Further particulars of the examples and control tests appear in the accompanying Tables 1 and 2. The physical characteristics of the blends from which the shortening and margarine products were made, appear in Table 1 while the melting characteristics and performance of the products is given in Table 2. From these it is clear that the required characteristics and performance of the products according to the invention is not met by the control blends, but that both the shortening and margarine products according to the invention give good performance.

The invention also provides culinary mixes including the fats and fat-continuous emulsion compositions described, in addition to flour and other, optional ingredients, e.g. sugar, dried egg, emulsifiers, stabilisers and flavouring agents customarily included in appropriate proportions for the preparation of baking mixes for the

I claim:

1. A fat-continuous food product having Solids Content Index Values of 11.8 to 16 at 20° C. and a maximum of 3 at 40° C., consisting of triglycerides of polyunsaturated acids, at least 2% trans acids, at most 31.9% combined trans and saturated fatty acids and at least 5% palmitic acid, the fat composition comprising a blend of unrandomised fats comprising:

a component which may be selectively hardened (I) selected from the group consisting of palm oil and cottonseed oil; and a vegetable oil component which may be selectively hardened (II) selected from the group consisting of soybean oil, sunflower oil and safflower oil in a weight ratio of component I to component II of 1 part to at least 2 parts.

2. A fat-continuous food product according to claim 1, wherein the component (I) is a stearic fraction of palm oil.

3. A fat-continuous food product according to claim 1, wherein the vegetable oil component (II) is a hardened vegetable oil and the component (I) is a hardened palm fat combined in a ratio of component II: component I of at least 2.

4. A fat continuous food product according to claim 1, wherein two thirds of the fat composition consists of the vegetable oil component II selected from soybean oil, sunflower oil or safflower oil.

5. A fat continuous food product according to claim 1, wherein 70–80% of the fat composition consists of the vegetable oil component II selected from soybean oil, sunflower oil or safflower oil.

6. A fat continuous food product according to claim 1 wherein the total saturated fatty acid content is at least 20%.

7. A fat continuous food product according to claim 1 wherein at least part of the palm fat has a slip melting point from 47°–50° C.

8. Culinary mixes suitable for use in the preparation of baking mixes for cakes, cookies or baked goods comprising flour and a fat continuous product according to claim 1.

9. Culinary mixes as claimed in claim 1 wherein the flour comprises a blend of extracted flour with unimpaired amylase activity and dietary fibre comprising the total non-endosperm fraction from separately milled grain selectively treated to suppress enzyme activity.

* * * * *